UNITED STATES PATENT

US 6,681,171 B2
Rimnac et al.
Date of Patent: Jan. 20, 2004

(54) CONDENSATION CONTROL FOR INTERNAL COMBUSTION ENGINES USING EGR

(75) Inventors: Phillip F. Rimnac, Saline, MI (US); Ravishankar Ramamurthy, Inkster, MI (US); Sameer Bhargava, Canton, MI (US)

(73) Assignee: Detroit Diesel Corporation, Detroit, MI (US)

(*) Notice: Subject to any disclaimer, the term of this patent is extended or adjusted under 35 U.S.C. 154(b) by 183 days.

(21) Appl. No.: 10/023,020

(22) Filed: Dec. 18, 2001

(65) Prior Publication Data

US 2003/0114978 A1 Jun. 19, 2003

(51) Int. Cl.$^7$ ............................ F02M 25/07; F02D 41/04
(52) U.S. Cl. .............. 701/108; 123/568.22; 123/568.31
(58) Field of Search .................................. 701/108, 109, 701/102; 123/568.16, 568.21, 568.22, 568.31; 60/278, 301; 73/117.3, 118.1

(56) References Cited

U.S. PATENT DOCUMENTS

| | | |
|---|---|---|
| 4,134,377 A | 1/1979 | Bamsey et al. |
| 4,147,141 A | 4/1979 | Nagano |
| 4,234,040 A | 11/1980 | Argyle et al. |
| 4,258,687 A | 3/1981 | Mauch et al. |
| 4,267,812 A | 5/1981 | Aula et al. |
| 4,291,760 A | 9/1981 | Argyle et al. |
| 4,436,147 A | 3/1984 | Hudson, Jr. |
| 5,172,550 A * | 12/1992 | Takeshima .................... 60/278 |
| 5,203,311 A | 4/1993 | Hitomi et al. |
| 5,440,880 A | 8/1995 | Caynow et al. |
| 5,607,010 A | 3/1997 | Schonfeld et al. |
| 5,617,726 A | 4/1997 | Sheridan et al. |
| 5,669,365 A | 9/1997 | Gartner et al. |
| 5,732,688 A | 3/1998 | Charlton et al. |
| 5,740,786 A | 4/1998 | Cartner |
| 5,771,868 A | 6/1998 | Khair |
| 5,785,030 A | 7/1998 | Paas |
| 5,802,846 A | 9/1998 | Bailey |
| 6,003,315 A | 12/1999 | Bailey |
| 6,009,709 A | 1/2000 | Bailey |
| 6,062,304 A | 5/2000 | Kremer et al. |
| 6,079,395 A | 6/2000 | Coleman |
| 6,085,732 A | 7/2000 | Wang et al. |
| 6,116,026 A | 9/2000 | Freese |
| 6,138,649 A | 10/2000 | Khair et al. |
| 6,155,042 A | 12/2000 | Perset et al. |
| 6,161,528 A | 12/2000 | Akao et al. |
| 6,164,071 A | 12/2000 | Shao et al. |
| 6,301,887 B1 * | 10/2001 | Gorel et al. ................ 60/605.2 |
| 6,508,111 B2 * | 1/2003 | Osaki et al. ................ 73/118.1 |

FOREIGN PATENT DOCUMENTS

JP        2000-136744    *   5/2000    ........... F02D/41/04

* cited by examiner

Primary Examiner—Hieu T. Vo
(74) Attorney, Agent, or Firm—Brooks Kushman P.C.

(57) ABSTRACT

A system and method for controlling an internal combustion engine to reduce or eliminate formation of EGR condensate monitor current ambient and operating conditions to determine whether conditions are favorable for condensation of EGR gases, and control the engine accordingly to avoid condensation, preferably by increasing the intake manifold temperature. The intake manifold temperature may be increased by redirecting some or all of the EGR flow to avoid the EGR cooler. Alternatively, or in combination, some or all of the charge air may be redirected to bypass the charge air cooler and/or redirected from the outlet of the turbocharger compressor to the intake, effectively increasing the intake air temperature and resulting in a corresponding increase of the intake manifold temperature. Conditions favorable for condensation may be determined based on engine speed and load, ambient temperature, manifold pressure, scheduled or actual EGR flow rate and scheduled or actual air/fuel ratio.

33 Claims, 3 Drawing Sheets

CONDENSATION CONTROL FOR INTERNAL COMBUSTION ENGINES USING EGR

BACKGROUND OF THE INVENTION

1. Field of the Invention

The present invention relates to a system and method for reducing or eliminating condensation associated with exhaust gas recirculation (EGR) for an internal combustion engine.

2. Background Art

A number of strategies have been developed for alternative charge air handling and turbocharging to drive and control exhaust gas recirculation (EGR) to reduce emissions for truck, automotive, and stationary engines used in power plants. One approach uses a variable geometry turbocharger (VGT), in combination with an EGR circuit to achieve the desired ratio of EGR rate and air/fuel ratio under transient and steady-state operation. In this arrangement, the EGR circuit generally includes a modulating (proportional) or on/off EGR valve, an EGR cooler, and an EGR rate measuring device with appropriate tubing or integral passages to direct exhaust gas to the engine intake under appropriate operating conditions. The management of EGR flow is performed by an electronic control unit (ECU). The ECU may use closed loop control of the EGR flow which is dependent on EGR rate measurement. The ECU may also control the VGT and/or EGR valve based on input from the rate measurement device to regulate EGR flow.

Recirculated exhaust gas acts as a dilutant to the charge air, and is used to lower the peak combustion temperature to reduce NOx formation. However, this also lowers the volumetric efficiency of the engine. This leads to a lower (richer) air/fuel ratio in comparison to a non-EGR engine because the recirculated exhaust gas has less oxygen content than the charge air due to the oxygen being consumed during the previous combustion process. For an EGR engine to maintain the same air/fuel ratio as a non-EGR engine under the same operating conditions generally requires an increased turbo boost which may in turn require an increase in back pressure to drive the recirculated exhaust gas.

As described above, NOx formation increases with increasing peak combustion temperatures. As such, NOx formation is directly related to the intake manifold temperature (IMT), which represents the temperature of the compressed intake air downstream of the charge air cooler and the EGR gases. The EGR cooler is used to cool the exhaust gases prior to combining with the charge air to lower the overall IMT and reduce the formation of NOx. However, under some operating and ambient conditions, the EGR cooler can excessively lower the recirculated exhaust gas temperature resulting in acidic condensation, which may lead to premature degradation of various components including the intake manifold and cylinder liner and kits.

DISCLOSURE OF THE INVENTION

The present invention provides a system and method for controlling an internal combustion engine to reduce or eliminate formation of EGR condensate. A representative system and method, in one embodiment of the present invention, monitor current ambient and operating conditions to determine whether conditions are favorable for condensation of EGR gases. When these conditions are detected, the engine is controlled accordingly to avoid condensation. Preferably, the engine is controlled to increase the intake manifold temperature to reduce or eliminate condensation. In one embodiment, the intake manifold temperature is increased by redirecting some or all of the EGR flow to avoid the EGR cooler such that the average EGR gas temperature increases and results in an increase of the intake manifold temperature. Alternatively, or in combination, some or all of the charge air may be redirected to bypass the charge air cooler and/or redirected from the outlet of the turbocharger compressor to the intake, effectively increasing the intake air temperature and resulting in a corresponding increase of the intake manifold temperature.

In one embodiment of the present invention, a method for controlling an internal combustion engine to reduce formation of EGR condensation includes determining current ambient conditions, determining current engine operating parameters, determining a dew point based on the current ambient conditions and engine operating conditions, comparing intake manifold temperature to the dew point, and controlling the engine to avoid condensation if the intake manifold temperature is within a particular range of the dew point. Controlling the engine to avoid condensation may include redirecting some or all of the EGR gas and/or charge air to bypass a corresponding EGR cooler and charge air cooler, respectively.

The present invention provides a number of advantages. For example, the present invention reduces or eliminates the formation of condensation within the intake system so that various engine components are not subjected to corrosive condensate related to use of EGR. The present invention does not require a humidity sensor to detect ambient humidity to avoid condensation and therefore may provide a lower cost, and less complex, strategy for avoiding EGR condensation than some prior art approaches.

In carrying out the above features and advantages of the present invention in addition to various other features and advantages, a system for providing exhaust gas recirculation in a multi-cylinder compression ignition internal combustion engine includes an EGR valve in communication with an exhaust side of the engine to selectively divert a portion of the exhaust through an EGR circuit to an intake side of the engine. An EGR cooler is disposed within the EGR circuit to cool the EGR flow. In one embodiment, a bypass valve is positioned downstream of the EGR valve and upstream of the EGR cooler to selectively divert at least a portion of recirculated exhaust gas around the EGR cooler based on engine and ambient operating conditions to reduce or eliminate condensation of the recirculated exhaust gas. The system may also include a charge air cooler bypass valve used alone or in combination with the EGR bypass valve to selectively bypass the charge air cooler for a portion or all of the charge air from the turbocharger before being mixed with the EGR flow to reduce or eliminate condensation in the intake manifold.

The present invention also includes computer readable storage media having stored instructions executable by a computer to control an internal combustion engine. The instructions include instructions for detecting current engine and ambient operating conditions favorable to formation of condensation, and controlling the EGR bypass valve and/or charge air cooler bypass valve to raise the intake manifold temperature to avoid condensation of EGR gas.

Various advantages and features of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
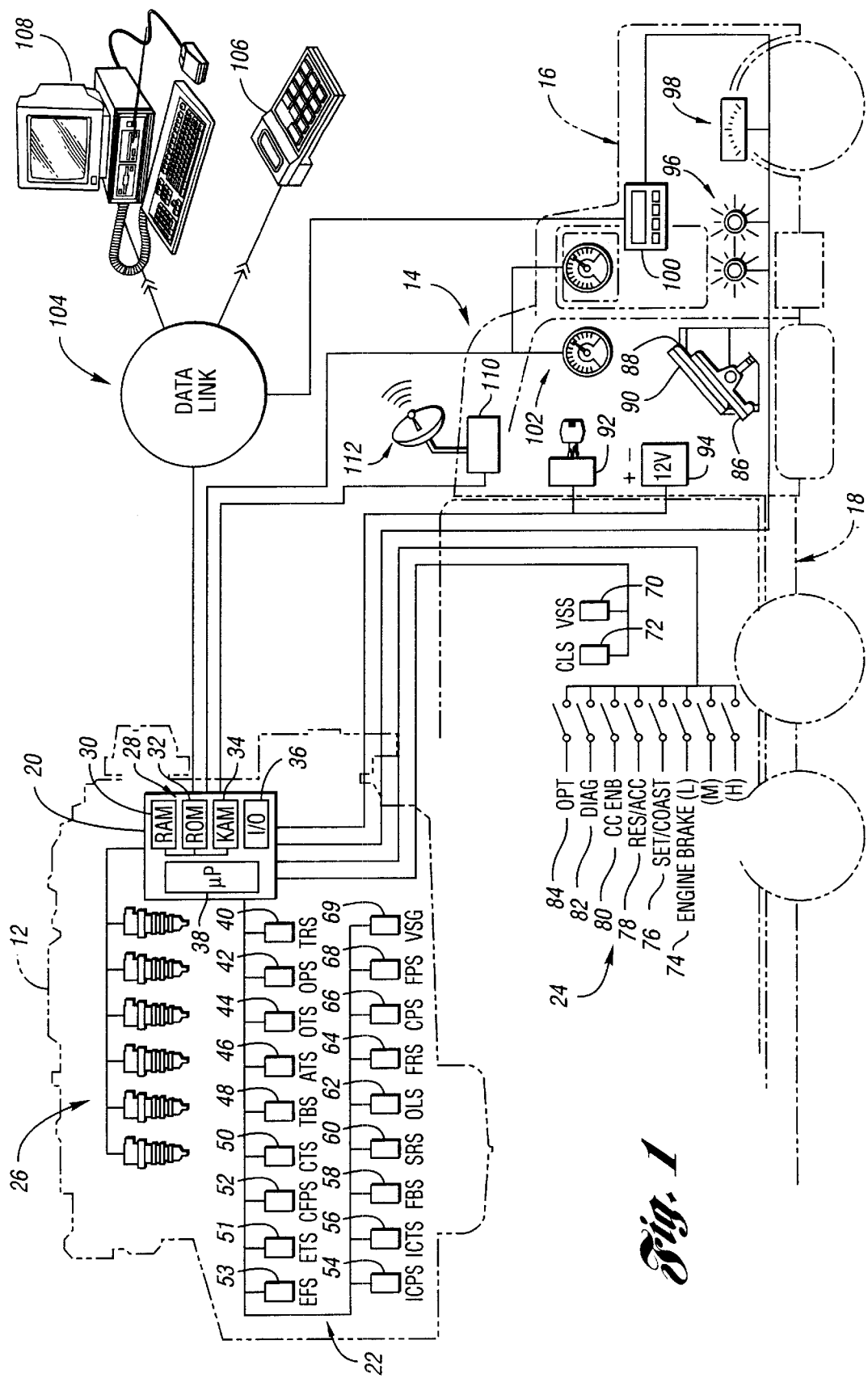
FIG. 1 is a block diagram illustrating a system or method for controlling an internal combustion engine to avoid EGR condensation according to one embodiment of the present invention.

FIG. 1 provides a schematic/block diagram illustrating operation of a system or method for controlling an internal combustion engine to avoid EGR condensation according to one embodiment of the present invention. System 10 includes a multi-cylinder compression ignition internal combustion engine, such as a diesel engine 12, which may be installed in a vehicle 14 depending upon the particular application. In one embodiment, vehicle 14 includes a tractor 16 and semi-trailer 18. Diesel engine 12 is installed in tractor 16 and interfaces with various sensors and actuators located on engine 12, tractor 16, and semi-trailer 18 via engine and vehicle wiring harnesses as described in greater detail below. In other applications, engine 12 may be used to operate industrial and construction equipment, or in stationary applications for driving generators, compressors, and/or pumps and the like.

An electronic engine control module (ECM) 20 receives signals generated by engine sensors 22 and vehicle sensors 24 and processes the signals to control engine and/or vehicle actuators such as fuel injectors 26. ECM 20 preferably includes computer-readable storage media, indicated generally by reference numeral 28 for storing data representing instructions executable by a computer to control engine 12. Computer-readable storage media 28 may also include calibration information in addition to working variables, parameters, and the like. In one embodiment, computer-readable storage media 28 include a random access memory (RAM) 30 in addition to various non-volatile memory such as read-only memory (ROM) 32, and keep-alive or non-volatile memory (KAM) 34. Computer-readable storage media 28 communicate with a microprocessor 38 and input/output (I/O) circuitry 36 via a standard control/address bus. As will be appreciated by one of ordinary skill in the art, computer-readable storage media 28 may include various types of physical devices for temporary and/or persistent storage of data which includes solid state, magnetic, optical, and combination devices. For example, computer readable storage media 28 may be implemented using one or more physical devices such as DRAM, PROMS, EPROMS, EEPROMS, flash memory, and the like. Depending upon the particular application, computer-readable storage media 28 may also include floppy disks, CD ROM, and the like.

In a typical application, ECM 20 processes inputs from engine sensors 22, and vehicle sensors/switches 24 by executing instructions stored in computer-readable storage media 28 to generate appropriate output signals for control of engine 12. In one embodiment of the present invention, engine sensors 22 include a timing reference sensor (TRS) 40 which provides an indication of the crankshaft position and may be used to determine engine speed. An oil pressure sensor (OPS) 42 and oil temperature sensor (OTS) 44 are used to monitor the pressure and temperature of the engine oil, respectively.

An air temperature sensor (ATS) 46 is used to provide an indication of the current intake or ambient air temperature. A turbo boost sensor (TBS) 48 is used to provide an indication of the boost pressure of a turbocharger which is preferably a variable geometry or variable nozzle turbocharger as described in greater detail below. As known by those of ordinary skill in the art, TBS 48 may also be used to provide an indication of the intake manifold pressure. Coolant temperature sensor (CTS) 50 is used to provide an indication of the coolant temperature. Depending upon the particular engine configuration and application, various additional sensors may be included. For example, engines which utilize exhaust gas recirculation (EGR) according to the present invention preferably include an EGR temperature sensor (ETS) 51 and an EGR flow sensor (EFS) 53. EFS 53 is preferably a sensor which detects a differential temperature of two heated elements to determine the mass flow rate of EGR through the EGR circuit. The heated elements preferably provide pyrolitic cleaning by being heated to a temperature to reduce or prevent soot accumulation. Alternatively, a ΔP sensor may be used to determine the EGR flow rate as described in U.S. application Ser. No. 09/641,256 filed Aug. 16, 2000 and assigned to the assignee of the present invention, the disclosure of which is hereby incorporated by reference in its entirety.

Applications utilizing a common rail fuel system may include a corresponding fuel pressure sensor (CFPS) 52. Similarly, an intercooler coolant pressure sensor (ICPS) 54 and temperature sensor (ICTS) 56 may be provided to sense the pressure and temperature of the intercooler coolant. Engine 12 also preferably includes a fuel temperature sensor (FTS) 58 and a synchronous reference sensor (SRS) 60. SRS 60 provides an indication of a specific cylinder in the firing order for engine 12. This sensor may be used to coordinate or synchronize control of a multiple-engine configuration such as used in some stationary generator applications. An EGR cooler (FIG. 2) and corresponding temperature sensor may also be provided to cool recirculated exhaust gas prior to introduction to the engine intake.

Engine 12 may also include an oil level sensor (OLS) 62 to provide various engine protection features related to a low oil level. A fuel restriction sensor (FRS) 64 may be used to monitor a fuel filter and provide a warning for preventative maintenance purposes. A fuel pressure sensor (FPS) 68 provides an indication of fuel pressure to warn of impending power loss and engine fueling. Similarly, a crankcase pressure sensor (CPS) 66 provides an indication of crankcase pressure which may be used for various engine protection features by detecting a sudden increase in crankcase pressure indicative of an engine malfunction.

System 10 preferably includes various vehicle sensors/switches 24 to monitor vehicle operating parameters and driver input used in controlling vehicle 14 and engine 12. For example, vehicle sensors/switches 24 may include a vehicle speed sensor (VSS) which provides an indication of the current vehicle speed. A coolant level sensor (CLS) 72 monitors the level of engine coolant in a vehicle radiator. Switches used to select an engine operating mode or otherwise control operation of engine 12 or vehicle 14 may include an engine braking selection switch 74 which preferably provides for low, medium, high, and off selections, cruise control switches 76, 78, and 80, a diagnostic switch 82, and various optional, digital, and/or analog switches 84. ECM 20 also receives signals associated with an accelerator or foot pedal 86, a clutch 88, and a brake 90. ECM 20 may also monitor position of a key switch 92 and a system voltage provided by a vehicle battery 94.

ECM 20 may communicate with various vehicle output devices such as status indicators/lights 96, analog displays 98, digital displays 100, and various analog/digital gauges 102. In one embodiment of the present invention, ECM 20 utilizes an industry standard data link 104 to broadcast various status and/or control messages which may include engine speed, accelerator pedal position, vehicle speed, and the like. Preferably, data link 104 conforms to SAE J1939 and SAE J1587 to provide various service, diagnostic, and control information to other engine systems, subsystems, and connected devices such as display 100. Preferably, ECM 20 includes control logic to determine current engine and ambient operating conditions to detect conditions favorable to EGR condensation and controls the engine accordingly to avoid EGR condensation. As described in greater detail below, ECM 20 preferably monitors engine speed and load, ambient temperature, EGR flow and temperature, turbo boost and/or manifold pressure, and air/fuel ratio to determine a threshold for activation of condensation avoidance strategies which may include selectively diverting at least a portion of the EGR flow around the EGR cooler to raise the intake manifold temperature and reduce or eliminate condensation of the recirculated exhaust gas. Similarly, at least a portion of the charge air may be selectively diverted around the charge air cooler.

A service tool 106 may be periodically connected via data link 104 to program selected parameters stored in ECM 20 and/or receive diagnostic information from ECM 20. Likewise, a computer 108 may be connected with the appropriate software and hardware via data link 104 to transfer information to ECM 20 and receive various information relative to operation of engine 12, and/or vehicle 14.

Figure 2:
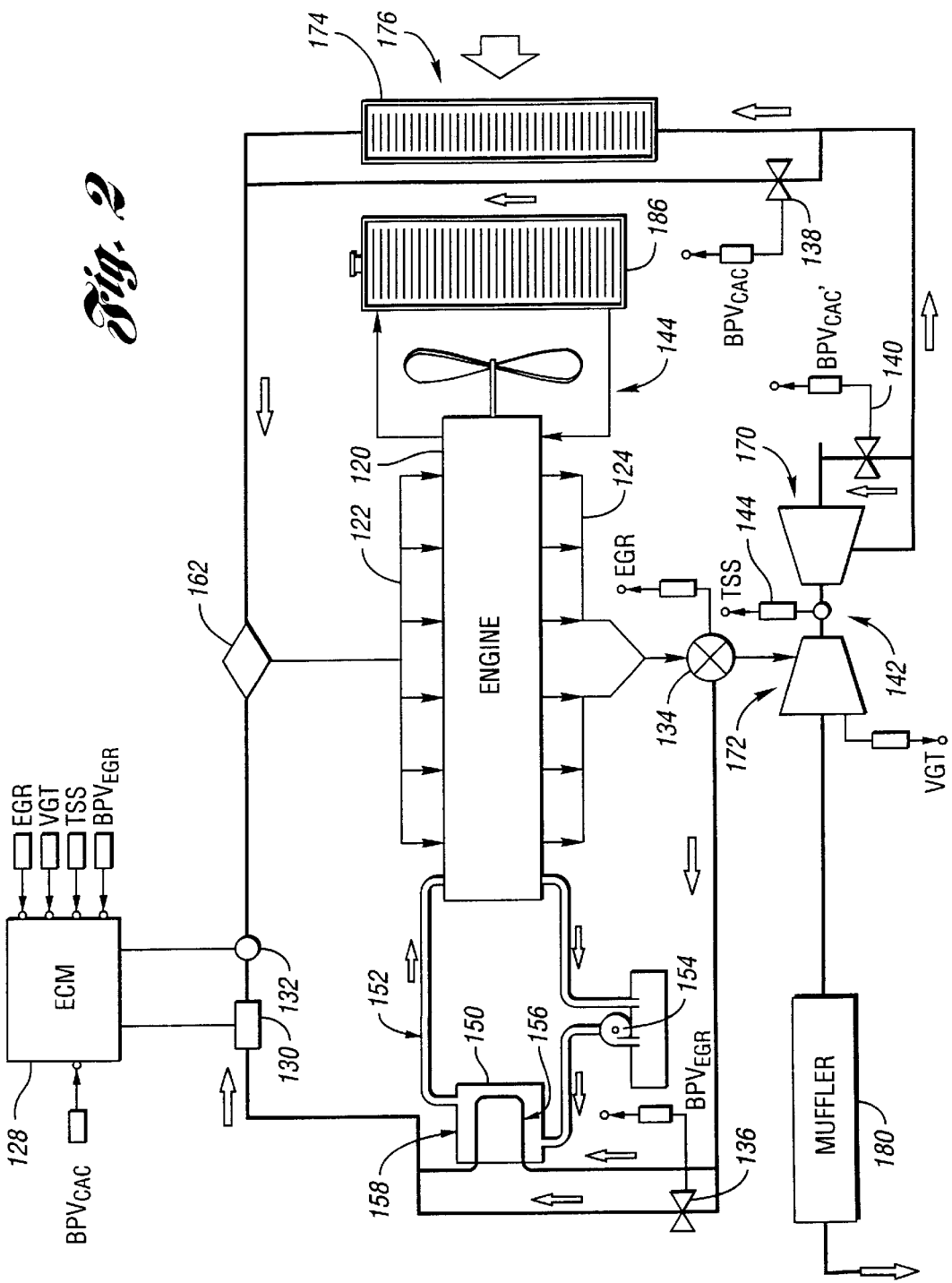
FIG. 2 is a block diagram illustrating a representative EGR circuit for a compression ignition engine having an EGR cooler bypass and charge air cooler bypass according to one embodiment of the present invention.

FIG. 2 is a block diagram illustrating a representative EGR system in communication with an ECM having control logic to control operation of the EGR circuit to reduce or eliminate condensation according to one embodiment of the present invention. Engine 120 includes an intake manifold 122, an exhaust manifold 124, and an exhaust gas recirculation (EGR) system indicated generally by reference numeral 126. An engine control module (ECM) 128 includes stored data representing instructions and calibration information for controlling engine 120. ECM 128 communicates with various sensors and actuators including EGR sensors such as EGR flow sensor 130 and EGR temperature sensor 132. ECM 128 controls EGR system 126 via actuators such as an EGR valve 134, EGR cooler bypass valve (BPV$_{EGR}$) 136, and optionally one or more charge air cooler bypass valves (BPV$_{CAC}$) 138, 140. In addition, ECM 128 preferably controls a variable nozzle or variable geometry turbocharger (VGT) 142 and monitors an associated turbo speed sensor 144 and turbo boost sensor as described with reference to FIG. 1.

EGR system 126 preferably includes an EGR cooler 150 which is connected to the engine coolant circuit indicated generally by reference numeral 152. EGR cooler 150 is preferably a full-flow cooler connected in-line with the engine coolant system, i.e. EGR cooler 150 receives the entire coolant flow for engine 120, although other arrangements and types of EGR coolers may be used without departing from the scope of the present invention. EGR cooler 150 may be directly coupled to a corresponding water or coolant pump 154, or may be placed at a different location in the engine cooling circuit depending upon the particular application. In addition, EGR cooler 150 is preferably a two-pass cooler having a first pass 156 and second pass 158 for the recirculated exhaust gas passing through the core.

The EGR cooler bypass valve (BPV$_{EGR}$) 136 may be selectively operated by ECM 128 to control temperature of the EGR flow by diverting none, some, or all of the flow around EGR cooler 150 based on current ambient and engine operating conditions as illustrated and described with reference to FIG. 3. Valve 136 may be a solenoid operated on/off valve so that some or all of the EGR flow will bypass EGR cooler 150 under operating and ambient conditions that promote condensation. Although a modulating bypass valve may be useful for some applications, it is not required because modulation of EGR valve 134 may be used to control the overall EGR flow. Similarly, one or more charge air bypass valves (BPV$_{CAC}$) 138, 140 may be provided to selectively raise the charge air temperature and consequently the intake manifold temperature. As illustrated, charge air bypass valve 140 selectively diverts none, some, or all of the charge air around charge air cooler 174. Alternatively, or in combination, bypass valve 140 diverts none, some, or all of the charge air from the outlet of turbocharger compressor 170 to the inlet to raise the inlet air temperature. Preferably, ECM 128 operates valves 136, and/or 138 and/or 140 to control the EGR temperature based on current ambient and operating conditions to reduce or eliminate condensation of the recirculated exhaust gas in the EGR circuit and the intake manifold. As described below, the control strategy may use ambient temperature, relative humidity, intake manifold temperature and pressure, air/fuel ratio, and % EGR to determine when to control EGR valve 134 and one or more bypass valves 136, 138, 140 to reduce or eliminate condensation.

In operation, ECM 128 controls EGR system 126 and VGT 142 based on current ambient and operating conditions and calibration information to mix recirculated exhaust gas with charge air via mixer 162 which is preferably a pipe union. The combined charge air and recirculated exhaust gas is then provided to engine 120 through intake manifold 122. In one preferred embodiment, engine 120 is a 6-cylinder compression-ignition internal combustion engine. ECM 128 includes control logic to monitor current ambient operating conditions, such as temperature and optionally humidity, and engine control parameters and operating conditions to control EGR system 126. During operation of engine 120, intake air passes through compressor portion 170 of VGT 142 which is powered by turbine portion 172 via hot exhaust gasses. Compressed air travels through charge air cooler 174 which is preferably an air-to-air cooler cooled by ram air 176. Charge air passes through cooler 174 to mixer 162 which is preferably a pipe union where it is combined with recirculated exhaust gas based on current engine operating conditions. Exhaust gas exiting engine 120 through exhaust manifold 124 passes through EGR valve 134 where a portion of the exhaust gas may be selectively diverted through EGR cooler 150. Bypass valve 136 is selectively operated to divert a portion (none, some, or all) of the diverted exhaust gas around cooler 150 to adjust the temperature of the recirculated exhaust gas. The EGR gases flow past EGR flow sensor 130 and temperature sensor 132 to mixing valve 162 where they are combined with compressed charge air. The remaining exhaust gasses not diverted by EGR valve 134 pass through turbine portion 172 of VGT 142 and muffler 180 before being exhausted to atmosphere. EGR cooler 150 cools the heated exhaust gas using engine coolant circuit 152. Engine coolant is in turn cooled via a cooling fan (shown on the left of radiator 186) and radiator 186.

As described above, one or more bypass valves may be added to the intake side of engine 120 upstream of charge air cooler (CAC) 174 to selectively divert some, all, or none of the charge air from compressor portion 170 of VGT 142. The charge air cooler (CAC) bypass valve(s) are selectively operated similar to EGR bypass valve 136 under ambient and operating conditions which may promote condensation within the intake manifold as described and illustrated with respect to FIG. 3. This strategy may be based on a measured, estimated, or predicted temperature for the charge air or the combined charge after mixing with EGR flow at mixer 162.

Figure 3:
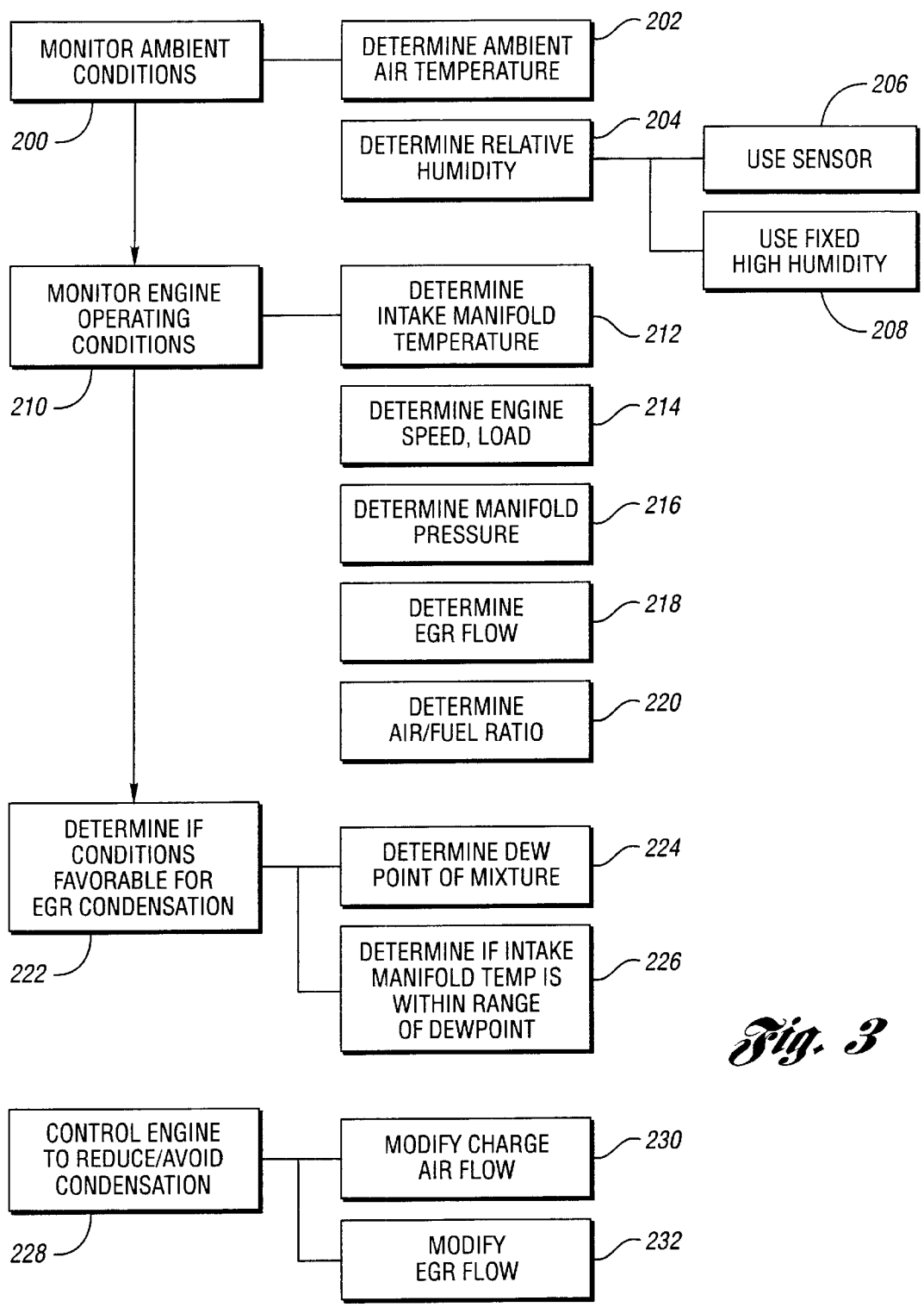
FIG. 3 is a block diagram illustrating operation of a system or method for controlling an internal combustion engine to avoid EGR condensation according to one embodiment of the present invention.

A block diagram illustrating operation of one embodiment for a system or method for controlling an engine to avoid EGR condensation according to the present invention is shown in FIG. 3. As will be appreciated by one of ordinary skill in the art, the block diagram of FIG. 3 represents control logic which may be implemented or effected in hardware, software, or a combination of hardware and software. The various functions are preferably effected by a programmed microprocessor, such as included in the DDEC controller manufactured by Detroit Diesel Corporation, Detroit, Mich. Of course, control of the engine/vehicle may include one or more functions implemented by dedicated electric, electronic, or integrated circuits. As will also be appreciated by those of skill in the art, the control logic may be implemented using any of a number of known programming and processing techniques or strategies and is not limited to the order or sequence illustrated in FIG. 3. For example, interrupt or event driven processing is typically employed in real-time control applications, such as control of an engine or vehicle rather than a purely sequential strategy as illustrated. Likewise, parallel processing, multi-tasking, or multi-threaded systems and methods may be used to accomplish the objectives, features, and advantages of the present invention. The invention is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the features and advantages of the present invention. The illustrated functions may be modified, or in some cases omitted, without departing from the spirit or scope of the present invention.

In various embodiments of the present invention, the control logic illustrated is implemented primarily in software and is stored in computer readable storage media within the ECM. As one of ordinary skill in the art will appreciate, various control parameters, instructions, and calibration information stored within the ECM may be selectively modified by the vehicle owner/operator while other information is restricted to authorized service or factory personnel. The computer readable storage media may also be used to store engine/vehicle operating information for vehicle owners/operators and diagnostic information for maintenance/service personnel. Although not explicitly illustrated, various steps or functions may be repeatedly performed depending on the type of processing employed.

In the representative embodiment of the present invention illustrated in FIG. 3, current ambient conditions are determined or monitored as represented by block 200. Ambient conditions may be determined using appropriate sensors or estimated or inferred depending upon the particular application. Preferably, block 200 includes at least a determination of the ambient air temperature as represented by block 202. The relative humidity may also be determined as represented by block 204 using a sensor as represented by block 206 or set to a predetermined value as represented by block 208. For example, rather than requiring a humidity sensor, the present invention may use a fixed high value for the relative humidity, such as 100%, which represents a very conservative calibration. This provides the greatest protection or margin of error for operating without formation of EGR condensation in the intake manifold. Of course, lower stored humidity values may be used in determining whether to bypass the EGR cooler and/or charge air cooler, although lower values are more likely to result in some condensation under certain ambient and operating conditions.

Current engine operating conditions are monitored or determined as represented by block 210. This may include determining the intake manifold temperature 212, engine speed and load 214, intake manifold pressure 216, EGR flow 218, and air/fuel ratio 220. The EGR flow 218 and air/fuel ratio 220 may be determined based on scheduled values or based on actual sensed values depending upon the particular application. The current ambient and operating conditions determined in blocks 200 and 210, respectively, are then used to determine whether conditions are favorable for EGR condensation in the intake manifold as represented by block 222. In one embodiment, a dew point of the combined EGR and charge air mixture is determined based on the current ambient and engine operating conditions as represented by block 224. The intake manifold temperature is then compared to the dew point (or other related threshold) to determine whether conditions are favorable for condensation, i.e. whether the intake manifold temperature is within a specified (calibratable and/or adaptable) range of the dew point as represented by block 226. The engine is then controlled to reduce/avoid condensation formation as represented by block 228. Preferably, controlling the engine includes at least one of modifying charge air flow as represented by block 230 and modifying EGR flow as represented by block 232. Other methods for increasing the intake manifold temperature may also be used in accordance with the present invention. In the representative embodiment illustrated in FIG. 2, EGR flow may be modified using a corresponding bypass valve to redirect none, some, or all of the EGR flow around the EGR cooler. Similarly, charge air flow may be redirected to increase its temperature.

In one embodiment of the present invention that does not require a humidity sensor, the ECM includes at least one stored table populated with intake manifold temperature threshold values for various ambient and operating conditions rather than actually calculating or determining a dew point of the EGR and charge air mixture. These previously stored values are then access or retrieved based on the current ambient temperature, engine speed, and engine load, for example. The temperature threshold is compared to the current intake manifold temperature with the EGR flow and/or charge air flow modified if the current intake manifold temperature falls below the threshold. The EGR flow and/or charge air flow is preferably modified to increase its/their temperature to result in an increased intake manifold temperature to reduce or eliminate EGR condensate within the intake manifold. In one embodiment, the EGR flow is modified such that some or all of the EGR flow bypasses a corresponding EGR cooler. Alternatively, or in combination, the charge air flow may be modified such that some or all of the charge air bypasses the charge air cooler. Those of ordinary skill in the art will recognize other alternative methods of modifying EGR flow and or charge air flow to increase the intake manifold temperature in accordance with the present invention. For example, a portion of the charge air may be redirected upstream of the charge air cooler to the intake of the turbocharger compressor.

As described above, the present invention provides a system and method for reducing or eliminating EGR condensate in the intake manifold of an internal combustion engine. While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for reducing or eliminating EGR condensation within an intake manifold of an internal combustion engine having an EGR circuit for recirculating exhaust gas to be combined with charge air upstream of the intake manifold, the engine including a charge air circuit having a turbocharger with a compressor for compressing intake air and having a charge air cooler positioned downstream from the turbocharger compressor, the system comprising:

means for selectively increasing charge air temperature prior to combining the charge air with recirculated exhaust gas in response to a command signal; and a controller in communication with the means for selectively increasing charge air temperature, the controller monitoring current ambient and engine operating conditions and generating the command signal when the current ambient and engine operating conditions are favorable for condensation.

2. The system of claim 1 further comprising:

means for selectively increasing temperature of the recirculated exhaust gas in response to a command signal, the means for selectively increasing temperature being in communication with the controller.

3. A system for reducing or eliminating EGR condensation within an intake manifold of an internal combustion engine having an EGR circuit for recirculating exhaust gas to be combined with charge air upstream of the intake manifold, the engine including a charge air circuit having a turbocharger with a compressor for compressing intake air and having a charge air cooler positioned downstream from the turbocharger compressor, the system comprising:

a bypass valve disposed within the charge air circuit upstream of the charge air cooler and downstream of the turbocharger compressor, the bypass valve selectively diverting at least a portion of the charge air in response to a command signal to increase charge air temperature prior to combining with the recirculated exhaust gas; and a controller in communication with the bypass valve, the controller monitoring current ambient and engine operating conditions and generating the command signal when the current ambient and engine operating conditions are favorable for condensation.

4. The system of claim 3 wherein the EGR circuit includes an EGR cooler for cooling recirculated exhaust gas prior to combining with the charge air, the system further comprising:

a bypass valve disposed within the EGR circuit upstream of the EGR cooler for selectively diverting at least a portion of the recirculated exhaust gas in response to a command signal from the controller to increase recirculated exhaust gas temperature prior to combining with the charge air.

5. The system of claim 3 wherein the bypass valve selectively diverts a portion of the charge air from the turbocharger compressor to an intake of the turbocharger compressor.

6. The system of claim 3 wherein the controller retrieves a previously stored threshold value using current engine speed, load, and ambient temperature and compares the threshold value to current intake manifold temperature to determine if conditions are favorable for condensation.

7. The system of claim 3 wherein the controller calculates a dew point for the combined recirculated exhaust gas and charge air, and compares the dew point to current intake manifold temperature to determine if conditions are favorable for condensation.

8. A computer readable storage medium having stored data representing instructions executable by a computer to control a multi-cylinder internal combustion engine having an EGR circuit to reduce or eliminate formation of condensation of EGR gases, the computer readable storage medium comprising:

instructions for determining current ambient conditions;

instructions for determining current engine operating conditions including at least an intake manifold temperature;

instructions for determining a dew point based on the current ambient conditions and engine operating conditions;

instructions for comparing the intake manifold temperature to the dew point; and instructions for controlling the engine to avoid condensation if the intake manifold temperature is within a specified range of the dew point.

9. The computer readable storage medium of claim 8 wherein the instructions for determining current ambient conditions comprise instructions for determining ambient air temperature and humidity.

10. The computer readable storage medium of claim 8 wherein the instructions for determining current engine operating conditions comprise instructions for determining engine speed, turbo boost pressure, EGR flow, and air/fuel ratio.

11. The computer readable storage medium of claim 8 wherein the instructions for controlling the engine comprise instructions for increasing intake manifold temperature.

12. The computer readable storage medium of claim 8 wherein the instructions for controlling the engine comprise instructions for redirecting at least a portion of EGR flow to bypass an EGR cooler.

13. The computer readable storage medium of claim 8 wherein the instructions for controlling the engine comprise instructions for redirecting at least a portion of charge air to bypass a charge air cooler.

14. The computer readable storage medium of claim 8 wherein the instructions for determining a dew point comprise instructions for determining the dew point based on current ambient temperature and a predetermined stored value for humidity.

15. The computer readable storage medium of claim 8 wherein the specified range of the dew point comprises an adaptable range.

16. The computer readable storage medium of claim 8 wherein the specified range of the dew is determined based on current engine operating conditions.

17. The computer readable storage medium of claim 16 wherein the current engine operating conditions include engine speed and load.

18. A method for controlling a multiple cylinder compression ignition internal combustion engine having an EGR circuit including an EGR cooler for cooling EGR gases and a charge air circuit including a charge air cooler, the method comprising:

determining current ambient temperature, engine speed, engine load, and intake manifold temperature;

retrieving a previously stored intake manifold temperature threshold value based on the current ambient temperature, engine speed, and engine load;

comparing the current intake manifold temperature to the retrieved intake manifold temperature threshold value; and modifying EGR flow or charge air flow based on the current intake manifold temperature being less than the threshold.

19. The method of claim 18 wherein the step of modifying comprises increasing temperature of the EGR flow or charge air flow to increase the intake manifold temperature.

20. A method for controlling a multi-cylinder internal combustion engine having an EGR circuit to reduce or eliminate condensation of EGR gases in an intake manifold, the method comprising:

determining current ambient conditions;

determining current engine operating conditions including at least an intake manifold temperature;

determining a dew point based on the current ambient conditions and engine operating conditions;

comparing the intake manifold temperature to the dew point; and controlling the engine to avoid condensation if the intake manifold temperature is within a specified range of the dew point.

21. The method of claim 20 wherein the step of determining current ambient conditions comprises determining ambient air temperature and humidity.

22. The method of claim 20 wherein the step of determining current engine operating conditions comprises determining engine speed, turbo boost pressure, EGR flow, and air/fuel ratio.

23. The method of claim 20 wherein the step of controlling the engine comprises increasing intake manifold temperature.

24. The method of claim 20 wherein the step of controlling the engine comprises redirecting at least a portion of EGR flow to bypass an EGR cooler.

25. The method of claim 20 wherein the step of controlling the engine comprises redirecting at least a portion of charge air to bypass a charge air cooler.

26. The method of claim 20 wherein the step of determining a dew point comprises determining the dew point based on current ambient temperature and a predetermined stored value for humidity.

27. The method of claim 20 wherein the specified range of the dew point comprises an adaptable range.

28. The method of claim 20 wherein the specified range of the dew point is determined based on current engine operating conditions.

29. The method of claim 28 wherein the current engine operating conditions include engine speed and load.

30. A method for controlling a multiple cylinder compression ignition internal combustion engine having an EGR circuit including an EGR cooler and a charge air circuit including a charge air cooler, the method comprising:

determining current ambient temperature;

determining current engine speed;

determining current engine load;

determining current intake manifold pressure and temperature;

determining EGR flow;

determining air/fuel ratio;

determining a threshold indicative of potential formation of EGR condensation based on the current ambient temperature, engine speed, engine load, intake manifold pressure, EGR flow, and air/fuel ratio;

comparing the current intake manifold temperature to the threshold; and redirecting at least a portion of the EGR or charge air around the EGR cooler or charge air cooler, respectively, when the current intake manifold temperature crosses the threshold.

31. The method of claim 30 wherein the step of determining a threshold further comprises determining the threshold based on a predetermined fixed value for relative humidity.

32. The method of claim 30 wherein determining intake manifold pressure comprises determining turbo boost pressure.

33. The method of claim 30 wherein the step of redirecting comprises redirecting both EGR flow and charge air flow around the EGR cooler and charge air cooler, respectively.

* * * * *